United States Patent
Friestad et al.

(10) Patent No.: US 9,301,441 B2
(45) Date of Patent: Apr. 5, 2016

(54) BRUSH CONDITIONER FOR A PLANTING UNIT

(71) Applicant: Deere & Company, Moline, IL (US)

(72) Inventors: Michael E. Friestad, Rock Island, IL (US); Elijah B. Garner, Bettendorf, IA (US); Robert W. Martin, Davenport, IA (US)

(73) Assignee: Deere & Company, Moline, IL (US)

( * ) Notice: Subject to any disclaimer, the term of this patent is extended or adjusted under 35 U.S.C. 154(b) by 134 days.

(21) Appl. No.: 14/170,299

(22) Filed: Jan. 31, 2014

(65) Prior Publication Data

US 2015/0216113 A1    Aug. 6, 2015

(51) Int. Cl.
*A01B 71/08* (2006.01)
*A01C 7/16* (2006.01)
*A01C 7/20* (2006.01)
*B08B 1/02* (2006.01)

(52) U.S. Cl.
CPC . *A01C 7/20* (2013.01); *A01B 71/08* (2013.01); *A01C 7/16* (2013.01); *B08B 1/02* (2013.01)

(58) Field of Classification Search
CPC .......... A01B 71/08; A01B 71/00; A01C 7/16; A01C 7/08; A01C 7/00; A01C 7/20; B08B 1/02; B08B 1/00
See application file for complete search history.

(56) References Cited

U.S. PATENT DOCUMENTS

2012/0067260 A1    3/2012   Garner et al.

FOREIGN PATENT DOCUMENTS

| DE | 19541162 | 5/1997 |
|----|----------|--------|
| DE | 19920250 | 11/2000 |
| DE | 19955066 | 5/2001 |

OTHER PUBLICATIONS

European Search Report for Related Application No. EP15152639, Dated Jun. 18, 2015.

*Primary Examiner* — Christopher J Novosad
(74) *Attorney, Agent, or Firm* — Ingrassia, Fisher & Lorenz PC

(57) ABSTRACT

A brush conditioner is described for a seeding machine that moves seed along a seed path with a brush belt having free brush ends and attached brush ends. The brush conditioner may include a conditioning member with a mounting portion and a conditioning portion. The mounting portion may be attached to the brush belt housing and the conditioning portion may angle away from the mounting portion to extend across the seed path. The conditioning portion may thereby contact a portion of the free brush ends to deflect the free brush ends toward the attached brush ends.

20 Claims, 11 Drawing Sheets

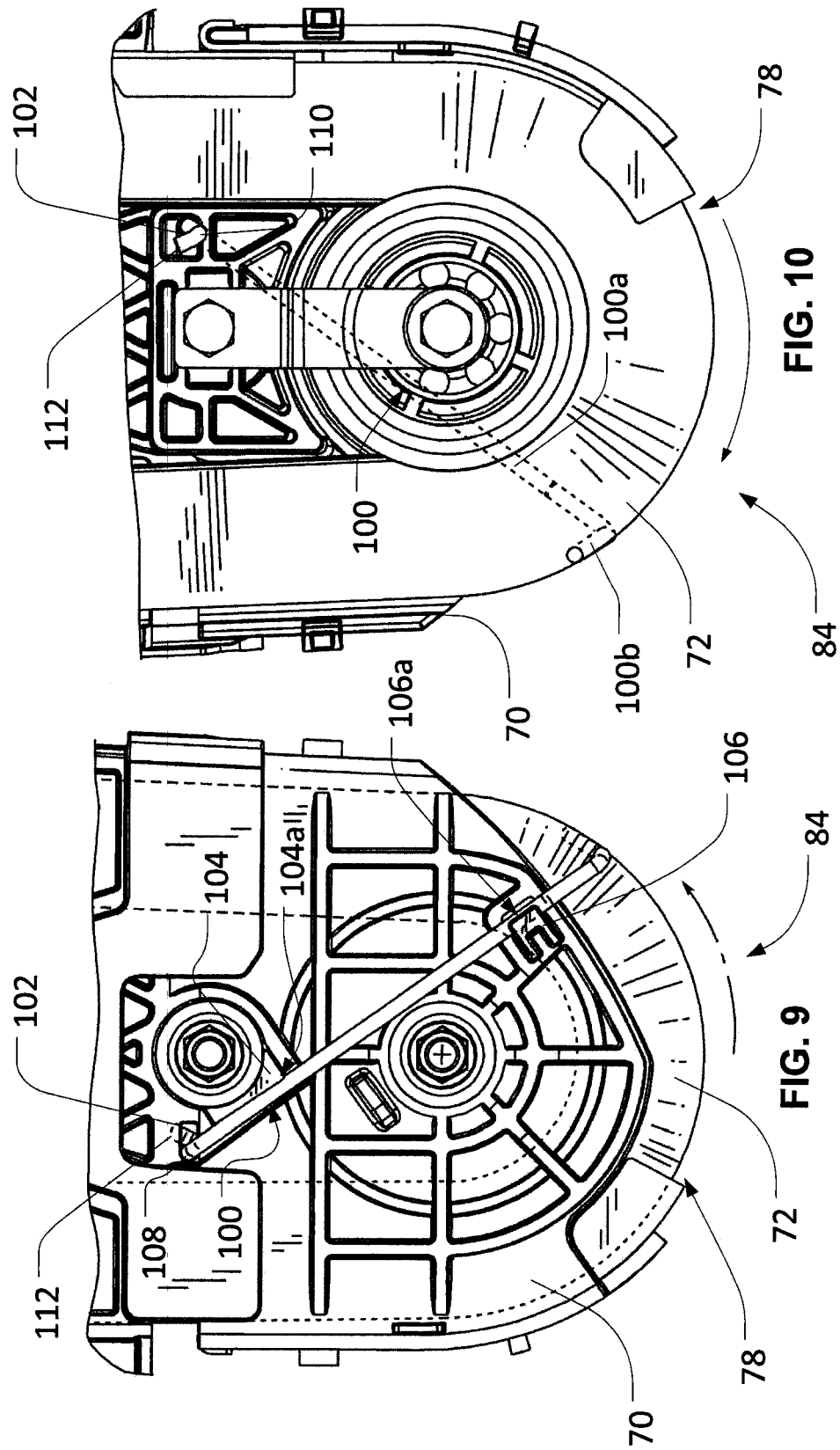

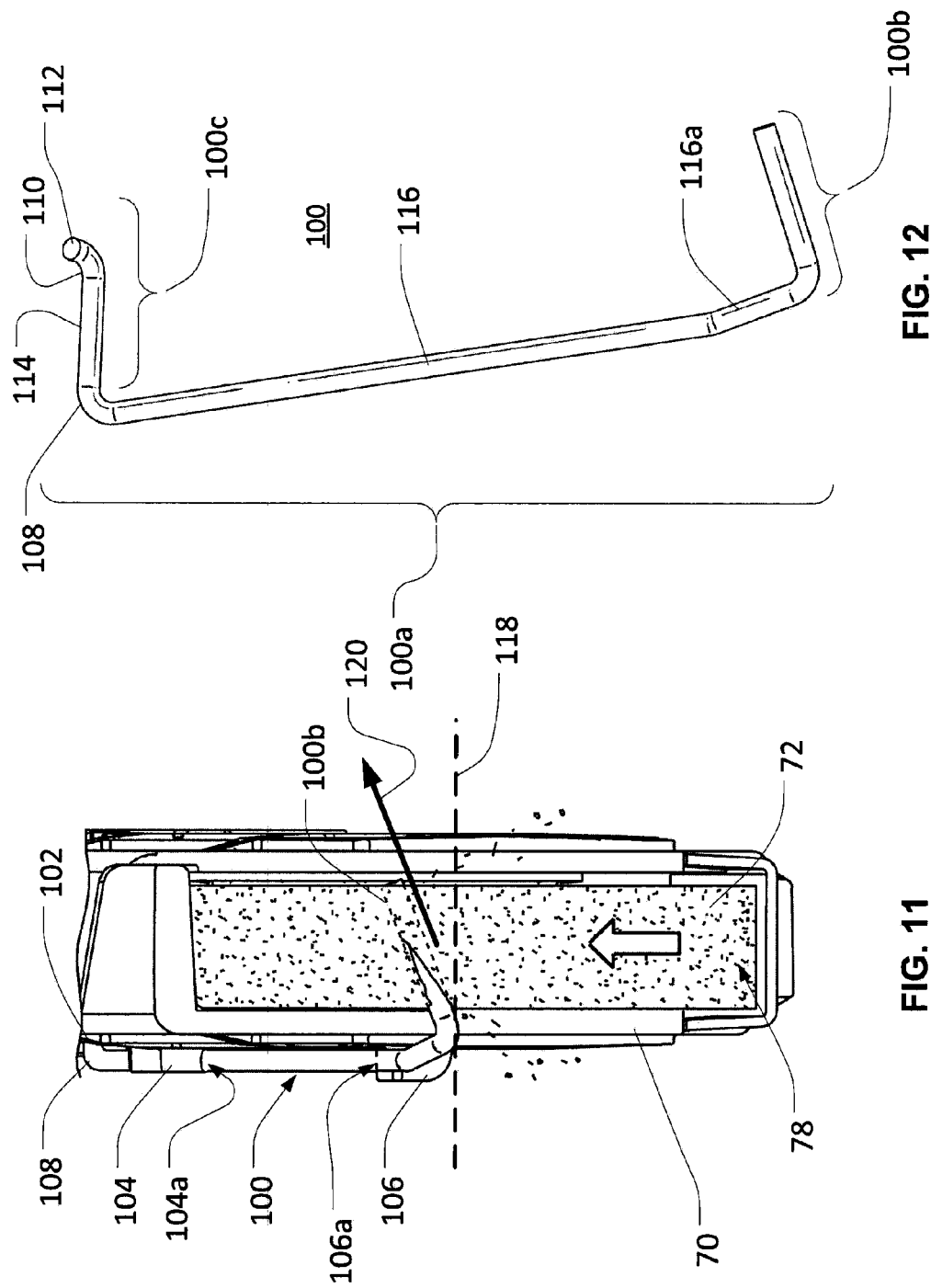

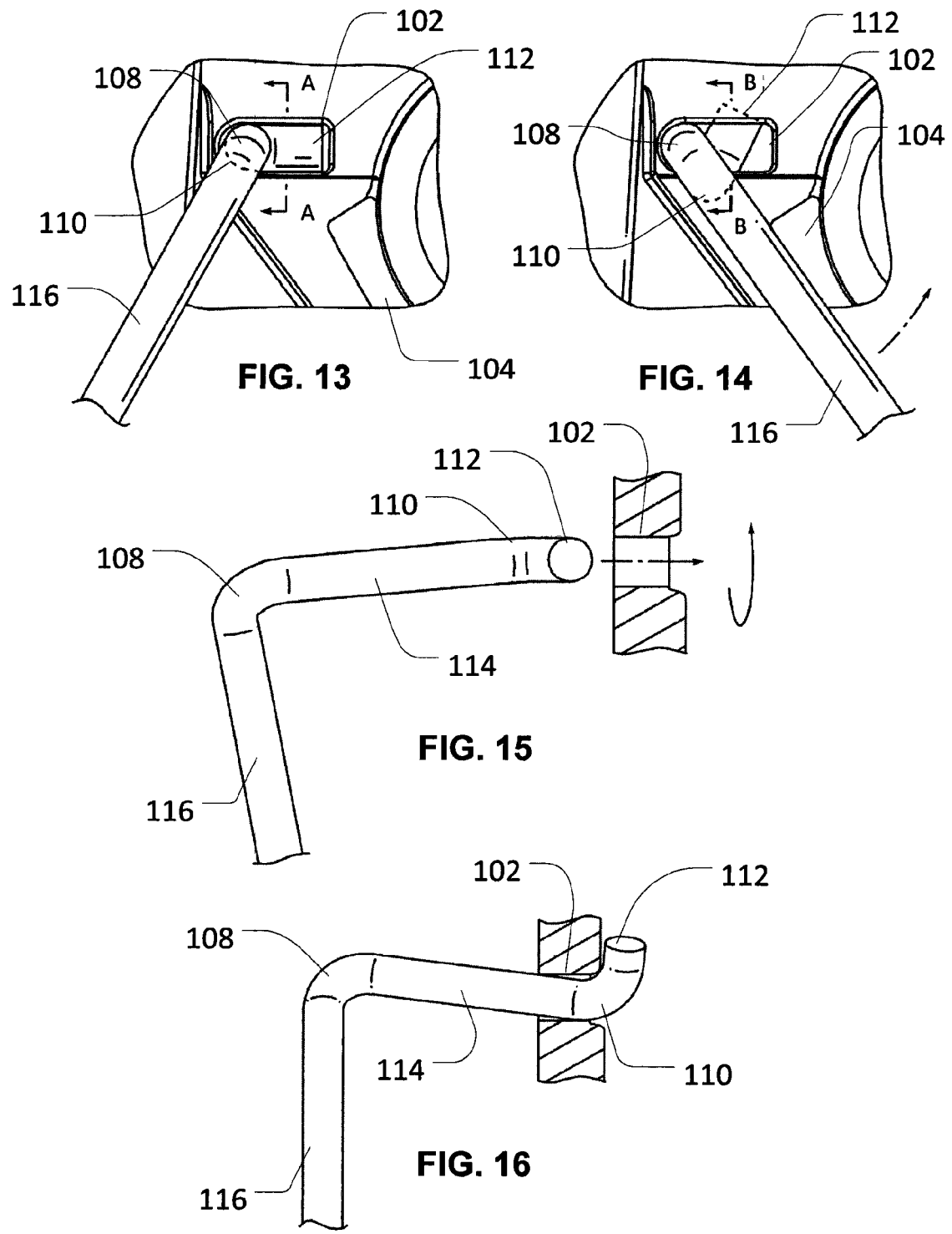

BRUSH CONDITIONER FOR A PLANTING UNIT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The following relates to planting units for a seeding machine or planter, including planting units having brush belt seed-transport systems.

BACKGROUND OF THE DISCLOSURE

In various types of seeding machines (or other mechanisms), seed (or similar material) may be transported by brush belts or similar transport mechanisms. For example, as depicted in U.S. Patent Publication 2012/0067260, a brush belt of a seed delivery system may receive seed from a seed meter for transport to a planting location. Such a brush belt (or similar transport mechanism) may tend to accumulate debris (e.g., dust, dirt, rocks, plant matter, and so on) in its bristles, which debris may interfere with optimal operation of the brush belt, the seed delivery system, and the seeding machine in general. Additionally, bristles of a brush belt may tend to become misaligned during operation of the brush belt, including due to the effects of accumulated debris.

SUMMARY OF THE DISCLOSURE

A brush conditioner is disclosed, which may be used to remove debris and other material from the brush belt of a seed delivery system or other similar apparatus and to re-align deformable portions of the brush belt.

According to one aspect of the disclosure, a seeding machine may be configured to move seed along a seed path with a brush belt. The brush belt may include free and attached brush ends and may be contained, at least in part, by a brush belt housing.

In certain embodiments, a brush conditioner for the seeding machine may include a conditioning member with a mounting portion and a conditioning portion. The mounting portion may be mounted to a housing of the brush belt, with the conditioning portion extending into the free brush ends to deflect the free ends toward the brush ends and thereby condition the brush belt. The conditioning portion may contact the free brush ends at a point where the free ends extend outside of the brush belt housing, which may be downstream of a release position for seed carried by the brush belt.

In certain embodiments, the conditioning member may be formed as a single piece, with a substantially straight middle portion. A retention slot extending into the brush belt housing may receive an retention portion of the conditioning member. The retention portion may include a locking elbow and locking portion, which may assist in retaining the retention portion within the retention slot when the conditioning member is operationally mounted to the housing. The housing may additionally (or alternatively) include a retention projection, with contact between the retention projection and the conditioning member resisting a moment imparted to the conditioning member by the contact of the free brush ends with the conditioning portion of the conditioning member. The housing may additionally (or alternatively) include a mounting tab defining a mounting slot, into which the mounting portion of the conditioning member may be inserted to secure the conditioning member to the housing.

In certain embodiments, multiple flexible extensions may be provided for the slide member, with various of the extensions oriented at an angle with respect to other extensions. The slide member may be movable between different mounting locations on the mounting fixture, with different mounting locations for the slide member corresponding to the flexible extensions being extended different distances toward (including into) the seed path. One or more pinch members may be used to fix the slide member to the mounting fixture at the various mounting locations, including by way of various engagement portions on the pinch members and the mounting fixture. A seed deflector with various deflection surfaces may be mounted to the mounting fixture, to direct a seed toward a seed pool of the planting unit. A hinged flap, brush or other flexible member may be provided on the seed deflector and may extend into the seed pool. The seed deflector may be mounted to the mounting fixture.

Various other embodiments are contemplated, within the scope of the discussion herein.

BRIEF DESCRIPTION OF THE DRAWINGS

FIG. 9 is a side view showing the brush conditioner and housing of FIG. 8;

FIG. 10 is an opposite side view thereof;

FIG. 11 is a bottom view thereof;

FIG. 12 is a perspective view of the brush conditioner of FIG. 8;

FIGS. 13 and 14 are enlarged views of a portion of the brush conditioner and housing of FIG. 8, illustrating an aspect of the mounting connection between the brush conditioner and the housing;

FIG. 15 is a sectional view of certain aspects of FIG. 13, taken along plane A-A of FIG. 13; and FIG. 16 is a sectional view of certain aspects of FIG. 14, taken along plane B-B of FIG. 14.

Like reference symbols in the various drawings indicate like elements.

DETAILED DESCRIPTION

The following describes one or more example embodiments of the disclosed brush conditioner for a brush belt seeding machine, as shown in the accompanying figures of the drawings described briefly above. Various modifications to the example embodiments may be contemplated by one of skill in the art.

As also noted above, during a seeding operation a brush belt or other seed transport mechanism of a seed transport device (e.g., a seed delivery system of a planter) may accumulate various debris (e.g., dust, dirt, rocks, plant matter, and so on). Such debris may tend to interfere with optimal operation of the brush belt, as well as various other mechanisms. For example, where a brush belt is designed to carry seed at the free ends of the belt's brush bristles, debris accumulated in the bristles may tend to restrict appropriate bristle movement (e.g., appropriate bristle deflection), prevent proper pick-up of the seed by the bristles, damage the seed in various ways, push the seed too deeply within the bristles, prevent proper discharge of the seed, and so on. Additionally, during operation of a brush belt (or other mechanism), bristles of the brush belt (or other deformable transport members) may tend to become misaligned. For example, accumulation of dust or other debris may cause brush bristles to clump together in various ways or otherwise deviate from a nominal configuration. Accordingly, it may be useful to provide a mechanism to clean debris from the bristles of a brush belt (or other similar seed transport mechanism), to re-align the bristles to a nominal configuration, and so on—i.e., to condition the bristles. Such a mechanism, for example, may include a conditioning member, a part of which extends into the path of the free ends of the bristles in order to deflect the bristles, remove various debris carried by the bristles, and so on.

In certain embodiments, a conditioner mechanism may be configured to install on a housing of a seed delivery system with minimal need for special tools or complicated installation procedures. For example, various features may be included on such a housing to allow for snap-on (or other) installation of a conditioner mechanism, thereby avoiding the need for specialized tools, connectors, hardware, or installation procedures.

Figure 1:
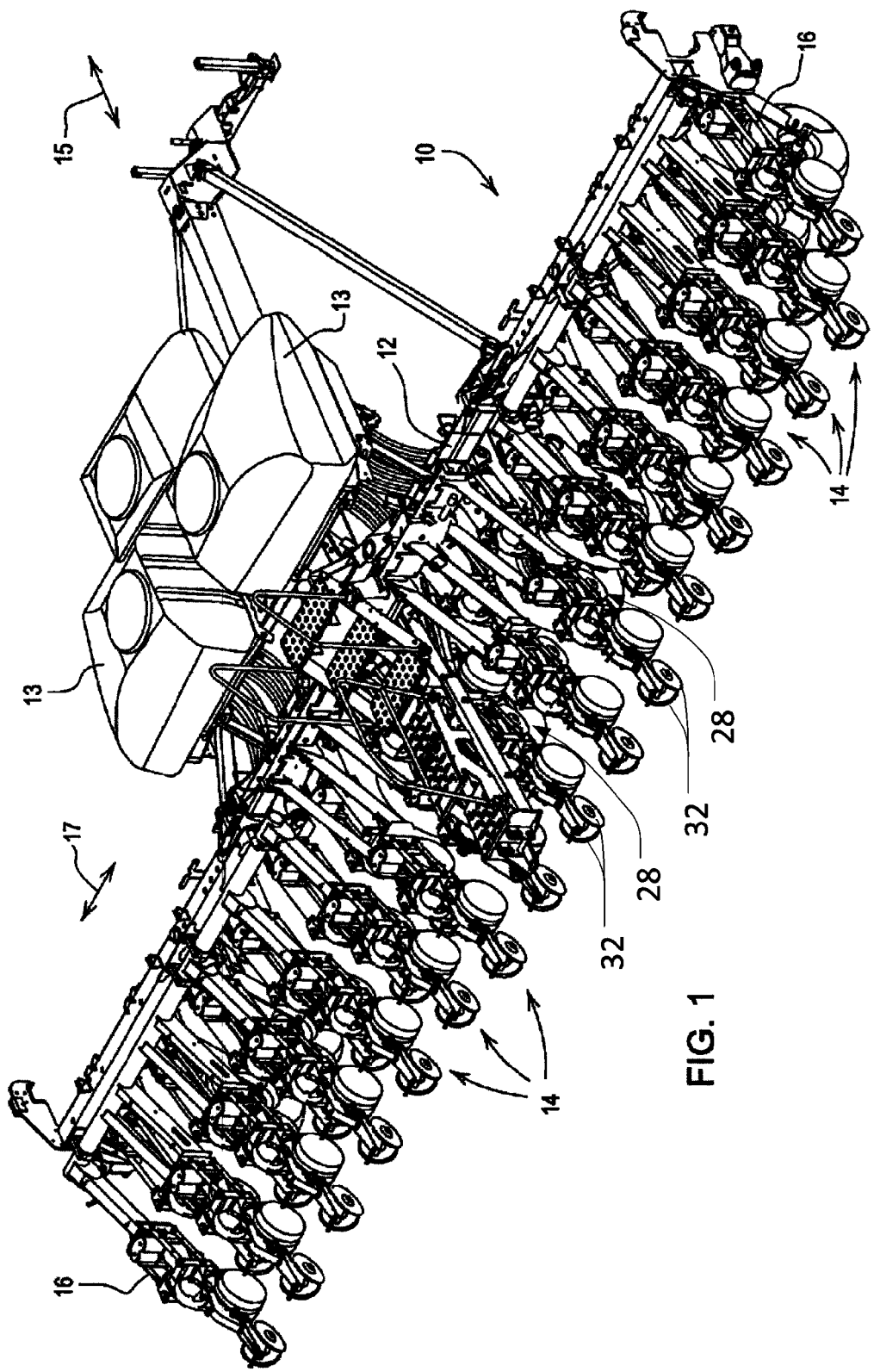
FIG. 1 is a perspective view of an example agricultural planter.

Referring now to FIG. 1, example agricultural seeding machine 10 is shown as a row crop planter. It will be understood that various other configurations may also be possible and that the disclosed conditioner may be used in a variety of agricultural machinery or other settings. Seeding machine 10 may include central frame 12 on which a plurality of individual planting units 14 may be mounted. Seeding machine 10 may be oriented with a fore-aft direction shown by arrow 15 and a transverse direction shown by arrow 17. Each planting unit 14 may be coupled to central frame 12 by a parallel linkage (e.g. linkage 16) so that individual planting units 14 may move up and down to a limited degree relative to frame 12. Large storage tanks 13 may hold seed that may be delivered pneumatically to a mini-hopper on each planting unit.

Figure 2:
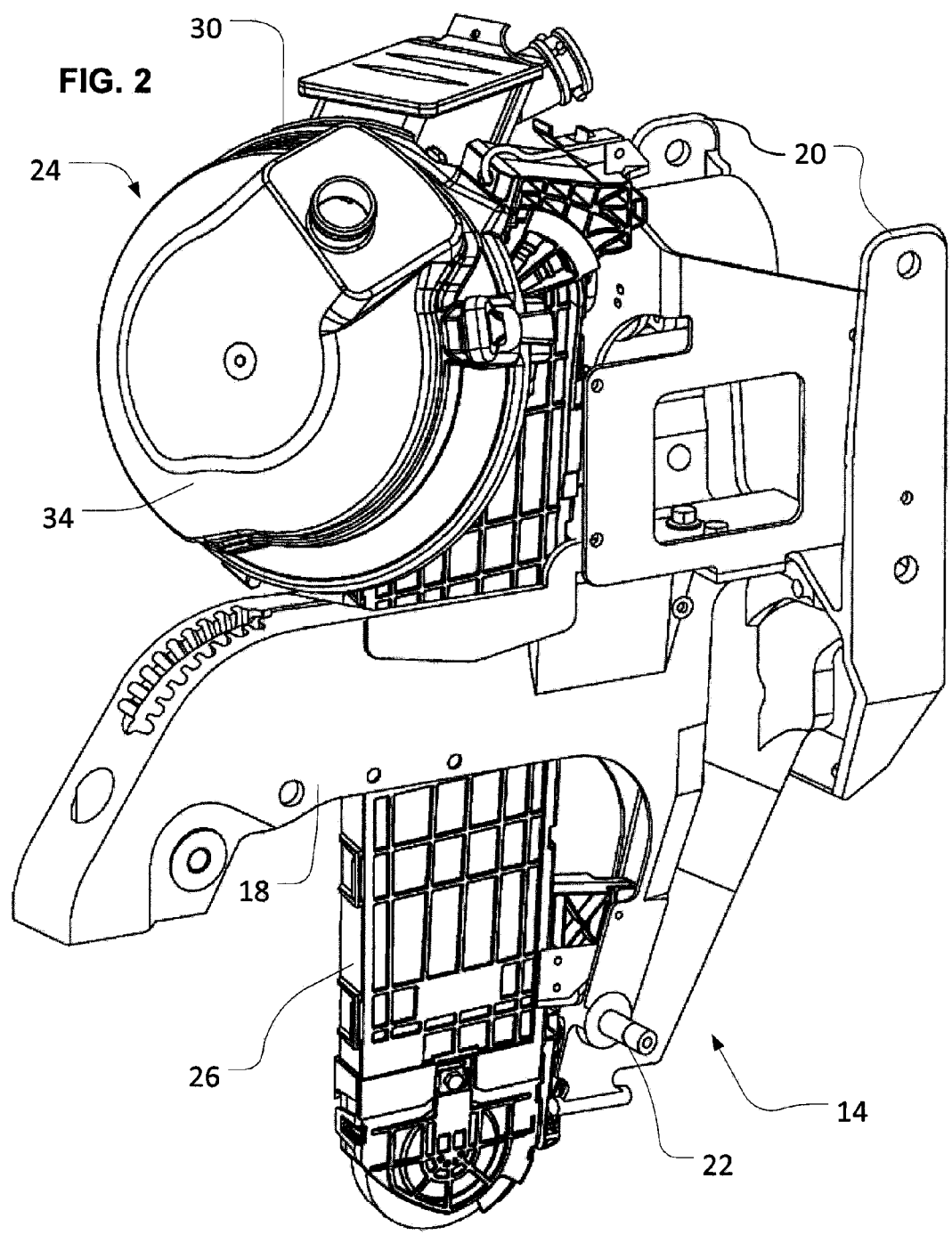
FIG. 2 is a side perspective view of a planting unit frame, seed meter and seed delivery system.

Referring also to FIG. 2, each planting unit 14 may be mounted, in various known ways, to frame member 18. (It will be understood that the disclosed conditioner may be utilized with planting unit 14, or with various other seed-handling or other devices (not shown).) Frame member 18 may include a pair of upstanding arms 20 at the forward end thereof. Arms 20 may be coupled to the rearward ends of parallel linkage 16. Furrow opening disks 28 (see FIG. 1) may be attached to shaft 22 in a known manner to form an open furrow in the soil beneath the seeding machine into which seed is deposited. Closing and packing wheels 32 (see FIG. 1) may also be mounted to frame member 18 in a known manner to close the furrow over the deposited seed and to firm the soil in the closed furrow. Seed meter 24 and seed delivery system 26 (depicted without a cover in FIG. 2) may also be attached to the frame member 18 of the planting unit.

Figure 3:
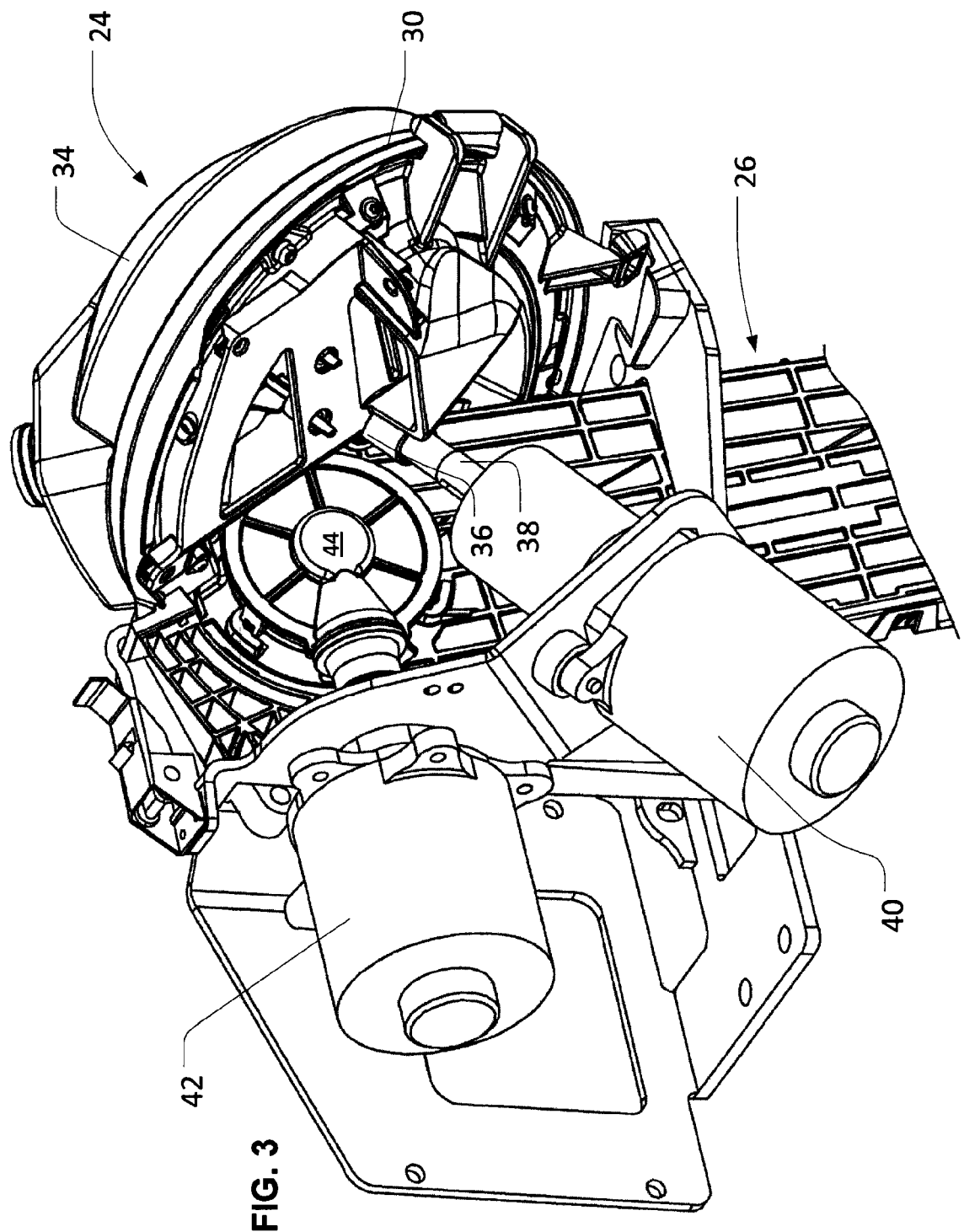
FIG. 3 is an enlarged perspective view of the seed meter and delivery system drives.
Figure 4:
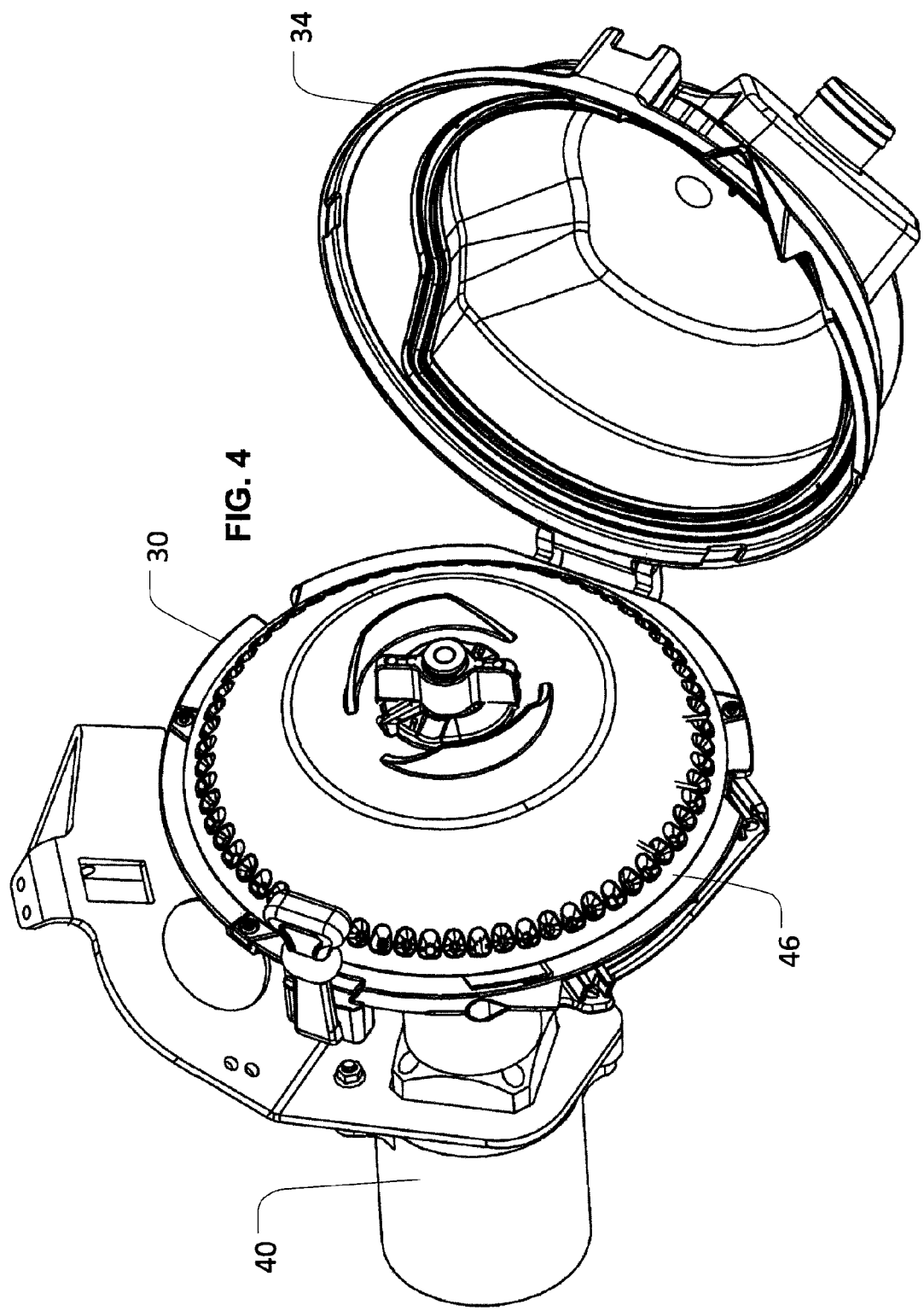
FIG. 4 is a perspective view of the seed meter with the cover open illustrating the metering member.

Referring also to FIGS. 3 and 4, seed meter 24 may include housing 30 and cover 34. Housing 30 and the cover 34 may be coupled to one another by complementary hinge features on housing 30 and cover 34, respectively. Drive spindle 36 may be carried by the housing 30 and may be couple to output shaft 38 of electric motor 40, in order to drive the seed meter when in the assembled position shown in FIG.

Delivery system 26 may be driven by electric motor 42. The output shaft of motor 42 may be connected to delivery system 26 through right-angle drive 44. While electric motors have been shown to drive both the seed meter and the seed delivery system, it will be appreciated by those skilled in the art that other types of motors, (e.g., hydraulic, pneumatic, and so on) can be used as well as various types of mechanical drive systems.

Figure 5:
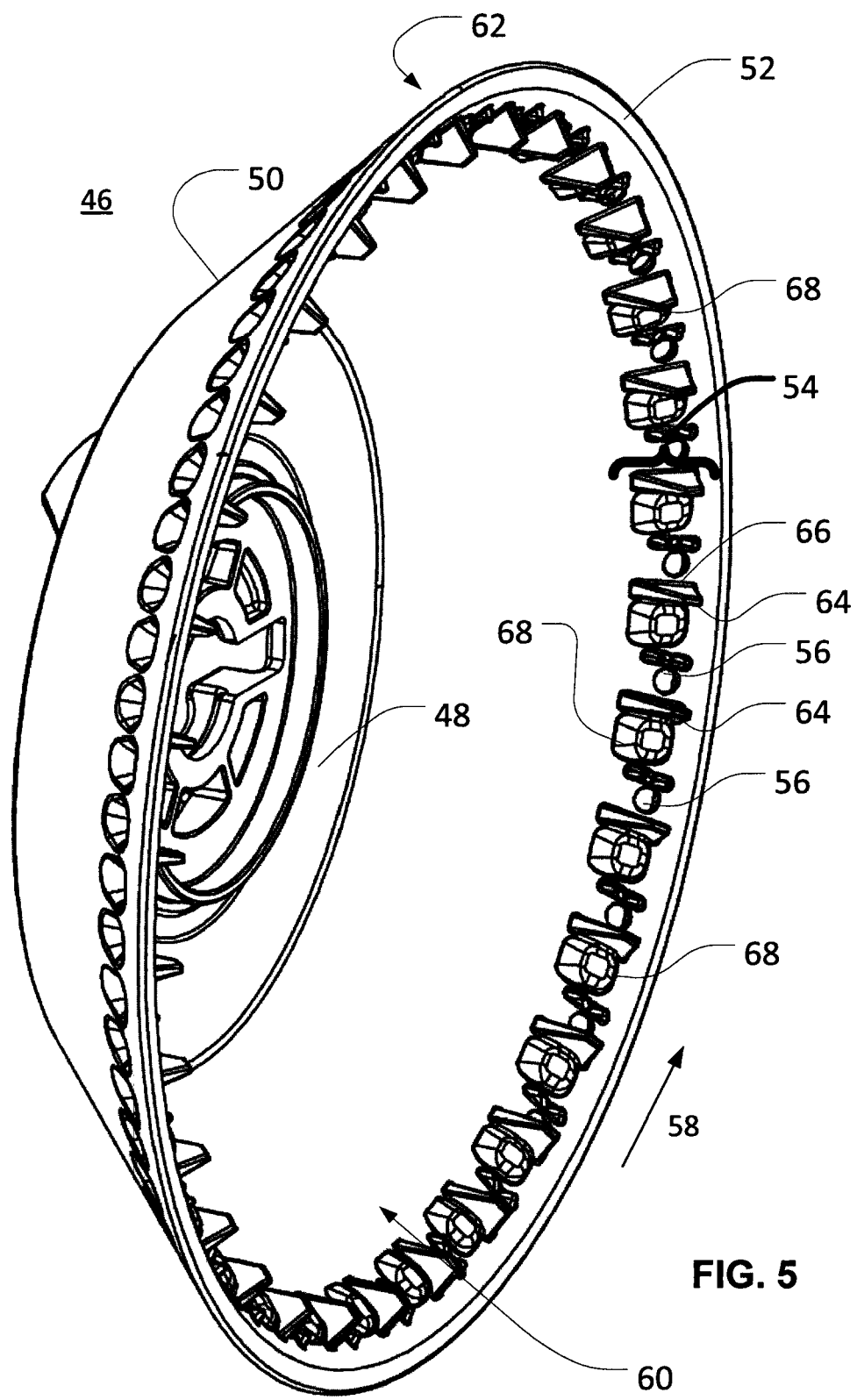
FIG. 5 is a perspective view of a metering member included in the seed meter of FIG. 4.
Figure 6:
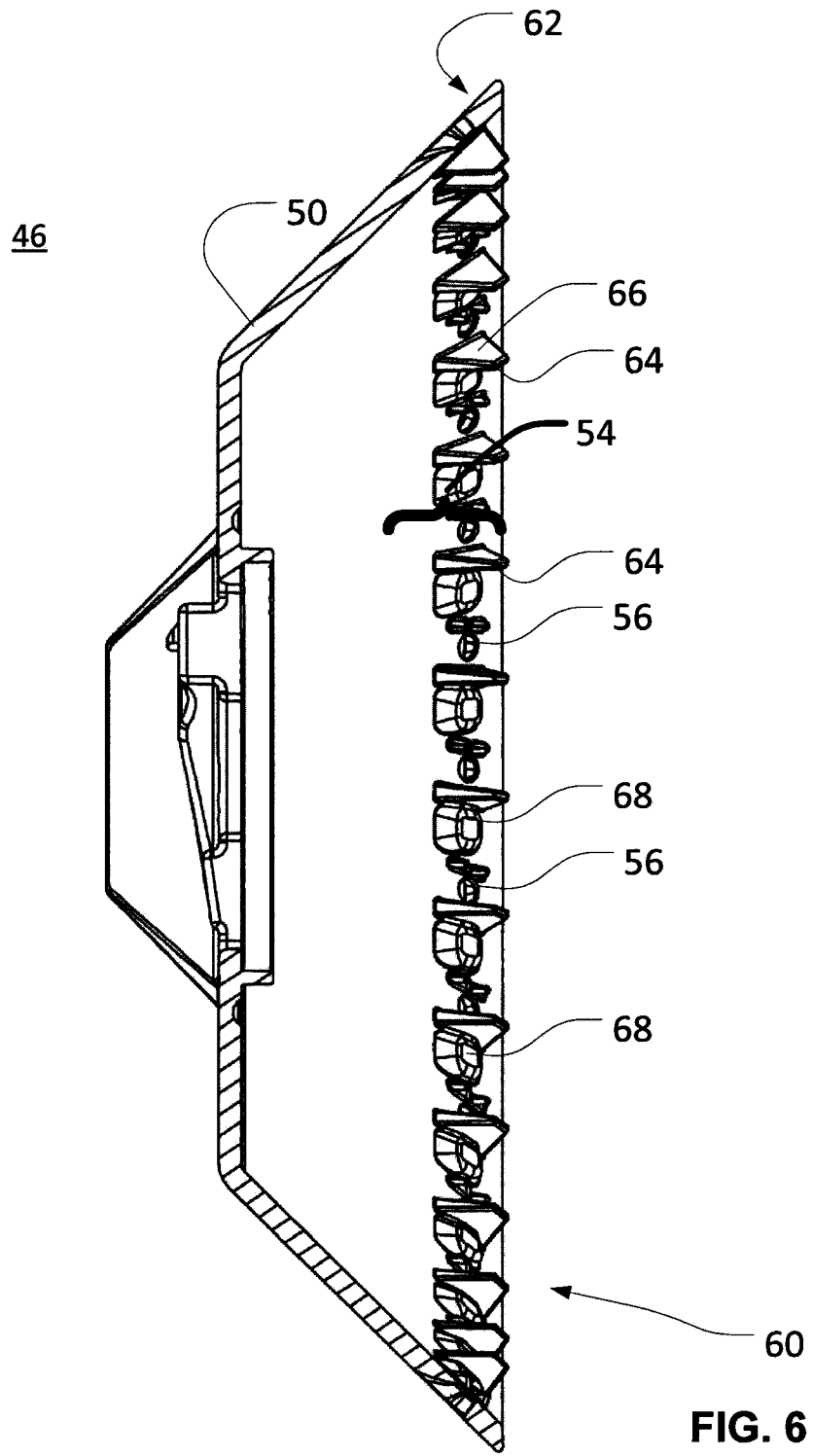
FIG. 6 is side cross-section of the metering member of FIG. 5.

Referring also to FIGS. 5 and 6, example metering member 46 of seed meter 24 is shown in greater detail. Metering member 46 may be (as shown) a concave bowl-shaped body. The bowl-shaped body may have base portion 48 from which side wall 50 extends. Side wall 50 may terminate in outer edge 52. Adjacent outer edge 52, side wall 50 may include rim portion 54, as indicated by bracket in FIGS. 5 and 6, which may extend radially outwardly and axially toward outer edge 52. Within rim portion 54, an annular array of apertures 56 may extend between the inner and outer surfaces of side wall 50.

Metering member 46 may be mounted in meter housing 30 for rotation in the direction of arrow 58 in FIG. 5. In operation, as the metering member rotates, individual seeds from seed pool 60 located at a bottom portion of metering member 46 may adhere to apertures 56 on the inner surface of side wall 50 and thereby be sequentially carried upward to release position 62 at an upper portion of metering member 46. A series of raised features or projections, such as paddles 64, may extend from the inner surface of side wall 50. In certain embodiments, one paddle may be located behind each aperture 56, with respect to direction of rotation, as shown by arrow 58. Each paddle 64 may, accordingly, form a confronting surface 66 behind the associated aperture in the direction of rotation to push a seed adhered to the aperture into delivery system 26 as described below. In certain embodiments, metering member 46, as installed in housing 30, may be oriented at an angle from vertical (not shown in FIG. 6).

As noted above, seed pool 60 may be formed at the bottom of metering member 46. Vacuum may be applied to the outer surface of side wall 50, causing individual seeds to be adhered to various apertures 56 as the apertures travel through the seed pool. As metering member 46 rotates as shown by arrow 58, seed may thereby be moved upward to release position 62 at the upper portion of metering member 46. Release position 62 may be slightly past the top or 12 o'clock position on the circular path of travel of the seed such that the seed is moving somewhat downward at the release position. Seed delivery system 26 may be positioned beneath the upper portion of metering member 46 at the release position 62 to take the seed from the metering member (e.g., as shown in FIG. 7).

Figure 7:
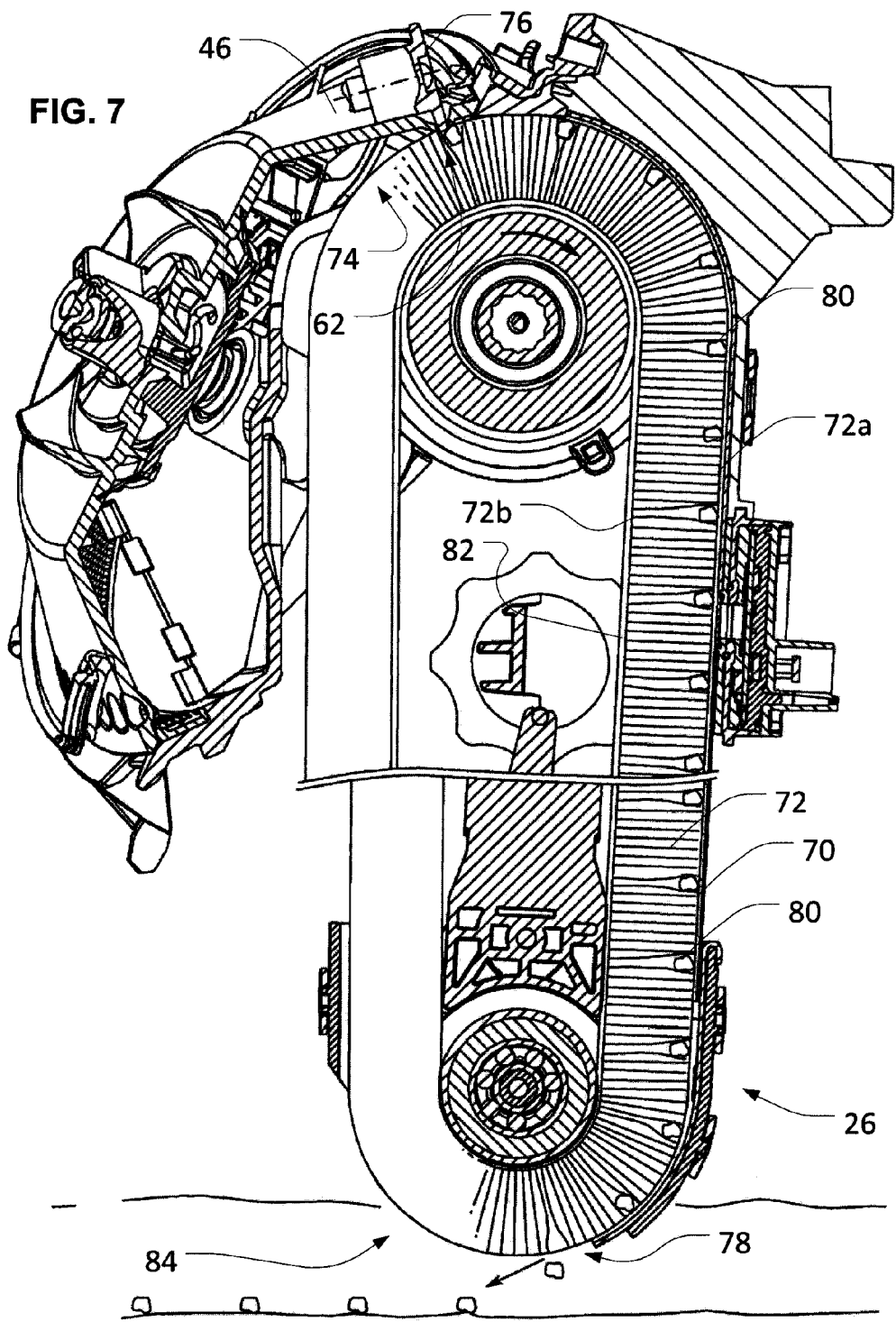
FIG. 7 is a side sectional view of aspects of one embodiment of the seed meter and seed delivery system.
Figure 8:
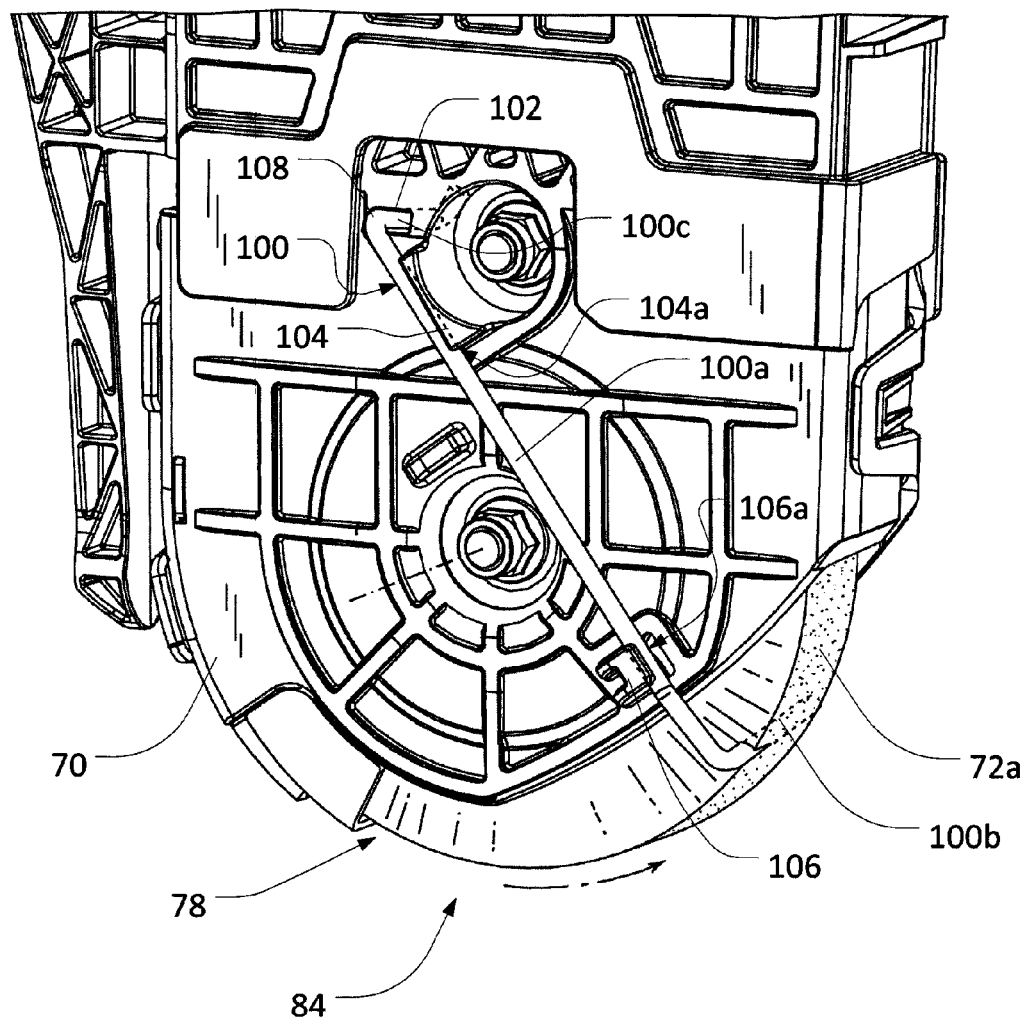
FIG. 8 is an enlarged partial perspective view of a brush conditioner mounted to a housing of the seed delivery system of FIG. 7.

Referring also to FIG. 7, delivery system 26 may include housing 70 partially enclosing bristles 72, which may generally travel in a clockwise direction (in FIG. 7) within housing 70. Bristles 72 may include attached ends 72b attached along along belt 82, with free ends 72a extending away from attached ends 72b. Upper opening 74 may be formed in housing 70 in order to allow seed 80 to enter housing 70 (e.g., from metering member 46). Free ends 72a of bristles 72 may extend through opening 74 in order to receive seed from metering member 46. (It will be understood that other configurations may also be possible. For example, delivery system 26 may be oriented horizontally, rather than vertically, or at various deviations from horizontal or vertical. As such, in a general sense, opening 74 may be viewed as an inlet opening to delivery system 26.)

Ejector 76 may ride on the outer surface of metering member 46, with projections from a star wheel on ejector 76 extending, sequentially, into apertures 56 in order to force seed out of apertures 56. Ejector 76, which may be biased against metering member 46 with a spring (not shown) may, accordingly, "walk" along metering member 46 such that successive projections of the star wheel sequentially eject seeds, at release position 62, from successive apertures 56. These ejected seeds may be captured by free ends 72a of bristles 72 and thereby carried along a path through housing 70 to seed ejection point 78 (as illustrated by various seeds 80 in FIG. 7). At (and downstream of) seed ejection point 78, housing 70 may include opening 84 to allow free ends 72a of bristles 72 to extend outside of housing 70. This opening may provide an exit opening from housing 70 for seed 80 (i.e., at ejection point 78). The opening may also provide an appropriate location for conditioning of bristles 72. For example, if a brush conditioner extends across bristles 72 (and into free ends 72a of bristles 72) within opening 84 and downstream of ejection point 78, the conditioner may cause bristles 72 to shed debris outside of housing 70 while not interfering with the transport of seed 80 by bristles 72 (i.e., because seed 80 may have been already ejected from bristles 72 at ejection point 78).

Referring also to FIGS. 8-12, an example configuration of a brush conditioner is depicted. As can be seen particularly in FIG. 12, a brush conditioner may include conditioning member 100, which may in turn include mounting portion 100a and conditioning portion 100b. In certain embodiments, mounting portion 100a may be further viewed as including retention portion 100c. Retention portion 100c, as discussed in greater detail below, may assist in securing conditioning member 100 to housing 70 (or otherwise fixing conditioning member 100 with respect to the path of bristles 72). Conditioning member 100 may be formed in various known ways, including as a single-piece wire or other metal member, a single-piece plastic or composite molding, or otherwise.

Conditioning member 100 may include various geometries, various aspects of which may be discussed in greater detail below. For example, mounting portion 100a may include substantially straight middle portion 116, with angled middle portion 116a ensuring appropriate alignment of conditioning portion 100b with bristles 72 and appropriate clearance between middle portion 116, conditioning portion 100b, and housing 70. Elbow 108 may connect middle portion 116 to insert portion 114, which may extend to locking elbow 110 and locking portion 112. Various other configurations may also be possible.

In FIGS. 8-11, conditioning member 100 is depicted in an example operational orientation. It will be understood, however, that other configurations may be possible. Conditioning member 100 may be secured with respect to bristles 72 in various ways, examples of which are discussed in greater detail below. In the operational orientation depicted, mounting portion 100a is mounted to housing 70 in various ways, with conditioning portion 100b extending across free ends 72a of bristles 72 in order to deflect free ends 72a and generally clean bristles 72 of debris.

Referring specifically to FIG. 11, it can be seen that conditioning portion 100b may be configured to extend across bristles 72 at an angle (as viewed from the perspective of the path of seeds 80 within bristles 72, the path of travel of free ends 72a of bristles 72, or reference line 118 transverse to belt 82). Such angling of conditioning portion 100b with respect to the seed path (or bristle path, or belt 82) may provide various benefits. For example, as a result of such an angled configuration of conditioning portion 100b, as debris is accumulated on (or at) portion 100b the passage of bristles 72 across portion 100b may tend to push debris off of portion 100b (and bristles 72) in the direction of arrow 120. As can be seen in FIG. 11, the free end of conditioning portion 100b may extend past the outside edge of bristles 72 (to the right in FIG. 11), such that debris being swept along angled conditioning portion 100b by bristles 72 may tend to be swept clear of both the conditioning portion 100b and bristles 72.

Still referring to FIGS. 8-11, it may be useful to provide various features on housing 70 (or at another mounting location) to assist in securing conditioning member 100 with respect to bristles 72. In various embodiments, such features may assist in mounting conditioning member 100 to housing 70 without the use of specialized tools, fasteners, or installation procedures, which may facilitate easy installation (and replacement) of conditioning member 100, even in in-field settings.

For example, in certain embodiments, housing 70 may include retention projection 104, which may present a contact surface for middle portion 116 of conditioning member 100 when member 100 is mounted to housing 70. In certain embodiments, retention projection may include curved groove 104a at this contact surface, which may receive part of middle portion 116 and thereby more securely retain conditioning member 100. It will be understood that as bristles 72 move across opening 84 (as shown by arrows in FIGS. 8-11) they may contact conditioning portion 100b and thereby impart a moment to conditioning member 100. When conditioning member 100 is seated against retention projection 104 (e.g., within groove 104a), retention projection 104 may resist this moment and thereby assist in retaining member 100 in the appropriate operational orientation and in returning member 100 to the operational orientation if member 100 is deflected or deformed by such a moment (or otherwise).

In certain embodiments, housing 70 may additionally (or alternatively) include mounting tab 106, which may extend away from housing 70 so as to form mounting groove 106a. Mounting groove 106a may receive middle portion 116 of conditioning member 100 and thereby further secure conditioning member 100 in its operational position. In certain embodiments, mounting groove 106a may be dimensioned, contoured, or otherwise configured to provide a snap- or friction-fit connection with middle portion 116 of conditioning member 100, which may further secure conditioning member 100 in the appropriate orientation without requiring additional hardware.

In certain embodiments, housing 70 may additionally (or alternatively) include retention slot 102, into which retention portion 100c of conditioning member 100 may be inserted in order to mount conditioning member 100 to housing 70. Referring also to FIGS. 13-16, the installation of retention portion 100c into retention slot 102 is depicted. As can be seen in FIGS. 13 and 15 (with FIG. 15 depicting a cross-sectional view of FIG. 13 through plane A-A), when conditioning member 100 is in a first orientation, locking portion 112 may be aligned so as to easily insert into retention slot 102. Once locking elbow 110 and locking portion 112 have been inserted into retention slot 102, conditioning member 100 may then be rotated to a second, operational orientation. As can be seen in FIGS. 14 and 16 (with FIG. 16 depicting a cross-sectional view of FIG. 14 through plane B-B), when conditioning member 100 is appropriately rotated (e.g., to an operational orientation), locking portion 112 may be out of alignment with retention slot 102. In this way, contact between locking portion 112 and housing 70 may prevent locking portion 112 and locking elbow 110 from being withdrawn from retention slot 102, thereby further securing conditioning member 100 with respect to housing 70.

It will be understood that other configurations may also be possible. For example, although locking portion 112 is depicted in FIG. 13 as having a length approximately equal to the length of retention slot 102, locking portion 112 may also be configured to have a longer or shorter length, with respect to retention slot 102, while still providing a similar locking functionality as conditioning member 100 is moved (e.g., rotated, twisted, and so on) from a first orientation to an operational orientation. With a longer length of locking portion 112, for example, locking portion 112 may be passed through retention slot 102 at an angle (with respect to the depiction of portion 112 in FIG. 13), and then still extend as depicted in FIG. 14 to secure locking portion 112 (and locking elbow 110) within retention slot 102 when conditioning member 100 is in an operational orientation.

In certain embodiments, various features of housing 70 and conditioning member 100, as discussed above, may interact in order to more securely fix conditioning member 100 with respect to housing 70 and bristles 72. For example, locking portion 112 and locking elbow 110 may be inserted into retention slot 102 as depicted in FIG. 13, then rotated to an operational (and locked) orientation as depicted in FIG. 14. This may cause middle portion 116 of conditioning member 100 to come into contact with retention projection 104, which may resist further rotation of conditioning member 100 in the direction of retention projection 104. Conditioning member 100 may then be temporarily deformed in order to insert middle portion 116 into mounting groove 106a of mounting tab 106, with the natural elasticity of conditioning member 100 (e.g., due to formation of conditioning member 100 from metal wire) causing conditioning member 100 to spring back from the deformation member 100 is aligned with groove 106a. In this way, retention slot 102, retention projection 104, mounting tab 106, and the geometry (and elasticity) of conditioning member 100 may cooperatively secure conditioning member 100 in an appropriate operational orientation. Further, if conditioning member 100 is itself deflected or deformed during operation of planting unit 14 (e.g., by contact with various obstructions within a field furrow), these features and geometry may also urge conditioning member 100 to return from the deflection or deformation to the operational orientation.

It will be understood that other configurations may also be possible. For example, as depicted in FIGS. 8-11, mounting groove 106a opens in a generally downstream direction with respect to the movement of bristles 72 (and seeds 80), with retention projection 104 providing a contact surface facing in a generally opposite direction. In certain embodiments, however, this configuration may be reversed, with retention projection 104 facing generally downstream with respect to the movement of bristles 72 and mounting groove 106a may open in a generally opposite direction. Various other modifications may be implemented, within the spirit of this disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

For example, the general orientation of the seed meter and delivery system can differ from that depicted in the figures. In particular, the figures illustrate a generally vertically oriented delivery system. However, the delivery system can instead be generally horizontal or at an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Accordingly, various embodiments and implementations other than those explicitly described are within the scope of the following claims.

What is claimed is:

1. A brush conditioner for a seeding machine that is configured to move seed along a seed path with a brush belt, the brush belt being contained, at least in part, by a brush belt housing and including attached brush ends and free brush ends, the brush conditioner comprising:
    a conditioning member having a mounting portion and a conditioning portion, the mounting portion being attached to the brush belt housing and the conditioning portion being angled with respect to the mounting portion and extending, at least in part, across the brush belt;
    wherein the conditioning portion contacts a portion of the free brush ends to deflect the free brush ends toward, at least in part, the attached brush ends and to remove debris from the free brush ends.

2. The brush conditioner of claim 1, wherein an exposed portion of the free brush ends extends out of the brush belt housing at an exit opening of the brush belt housing; and
    wherein, by extending across the brush belt, the conditioning portion contacts the exposed portion of the free brush ends.

3. The brush conditioner of claim 2, wherein the conditioning portion contacts the exposed portion of the free brush ends downstream, with respect to the seed path, of an ejection point for the seed.

4. The brush conditioner of claim 1, wherein the conditioning portion is attached to the mounting portion at an attached end and extends from the attached end across the brush belt at an angle with respect to the seed path.

5. The brush conditioner of claim 1, further comprising:
    a retention slot extending into the brush belt housing;
    wherein the mounting portion of the conditioning member includes a retention portion opposite the conditioning portion, the retention portion securing the conditioning member to the brush belt housing without separate fasteners when the retention portion is inserted, at least in part, into the retention slot.

6. The brush conditioner of claim 5, wherein the retention portion includes a locking elbow and a locking portion extending away from the locking elbow;

wherein the locking elbow and the locking portion are inserted into the retention slot with the conditioning member at a first orientation; and wherein rotating the conditioning member from the first orientation to an operational orientation rotates the locking elbow and the locking portion with respect to the retention slot, the locking portion thereby contacting the brush belt housing to prevent the retention portion from being withdrawn from the retention slot.

7. The brush conditioner of claim 1, further comprising
a retention projection extending away from the brush belt housing;
wherein, contact between the retention projection and the mounting portion of the conditioning member resists a moment imparted to the conditioning member by the contact of the free brush ends with the conditioning portion of the conditioning member.

8. The brush conditioner of claim 1, further comprising:
a mounting tab extending away from the brush belt housing and defining a mounting groove, the mounting groove receiving the mounting portion of the conditioning member to secure the conditioning member to the brush belt housing without separate fasteners.

9. The brush conditioner of claim 8, wherein the mounting groove opens, at least in part, on a downstream side of the mounting tab with respect to the seed path.

10. The brush conditioner of claim 8, further comprising:
a retention projection extending away from the brush belt housing;
wherein contact between the retention projection and the mounting portion of the conditioning member resists withdrawal of the mounting portion of the conditioning member from the mounting groove.

11. A brush conditioner for a seeding machine that is configured to move seed along a seed path with a brush belt, the brush belt being contained, at least in part, by a brush belt housing and including attached brush ends and free brush ends, the brush conditioner comprising:
a single-piece conditioning member having a mounting portion and a conditioning portion, the mounting portion being attached to the brush belt housing and the conditioning portion being angled with respect to the mounting portion and extending, at least in part, across the brush belt;
wherein an exposed portion of the free brush ends extends out of the brush belt housing at an exit opening of the brush belt housing; and
wherein, by extending across the brush belt, the conditioning portion contacts the exposed portion of the free brush ends to deflect the free brush ends toward, at least in part, the attached brush ends and to remove debris from the free brush ends.

12. The brush conditioner of claim 11, wherein the conditioning portion contacts the exposed portion of the free brush ends downstream, with respect to the seed path, of an ejection point for the seed.

13. The brush conditioner of claim 12, wherein the conditioning portion extends across the brush belt at an angle with respect to the seed path.

14. The brush conditioner of claim 11, wherein the mounting portion of the conditioning member includes:
a substantially straight middle portion extending between a first end at the conditioning portion and a second end with a first elbow;
a substantially straight insert portion extending away from the middle portion and toward the brush belt housing at the first elbow;
a locking elbow at an end of the insert portion that is opposite the first elbow; and
a locking portion extending away from the insert portion at the locking elbow.

15. The brush conditioner of claim 14, further comprising:
a retention slot extending into the brush belt housing;
wherein the retention slot receives the locking portion, the locking elbow and, at least in part, the insert portion of the conditioning member, to secure the conditioning member to the brush belt housing without separate fasteners.

16. The brush conditioner of claim 15, wherein the locking elbow and the locking portion are inserted into the retention slot with the conditioning member at a first orientation; and
wherein rotating the conditioning member from the first orientation to an operational orientation rotates the locking elbow and the locking portion with respect to the retention slot, the locking portion thereby contacting the brush belt housing to prevent the locking elbow and the locking portion from being withdrawn from the retention slot.

17. The brush conditioner of claim 11, further comprising
a retention projection extending away from the brush belt housing;
wherein, contact between the retention projection and the conditioning member resists a moment imparted to the conditioning member by the contact of the free brush ends with the conditioning portion of the conditioning member.

18. The brush conditioner of claim 11, further comprising:
a mounting tab extending away from the brush belt housing and defining a mounting groove, the mounting groove receiving the conditioning member to secure the conditioning member to the brush belt housing without separate fasteners.

19. The brush conditioner of claim 18, wherein the mounting groove opens, at least in part, on a downstream side of the mounting tab, with respect to the seed path.

20. The brush conditioner of claim 18, further comprising:
a retention projection extending away from the brush belt housing;
wherein contact between the retention projection and the conditioning member resists withdrawal of the conditioning member from the mounting groove.

* * * * *